United States Patent [19]

Bills, Sr.

[11] Patent Number: 6,095,787
[45] Date of Patent: Aug. 1, 2000

[54] METHOD OF MAKING A SKID-RESISTANT BED LINER

[75] Inventor: Dennis B. Bills, Sr., Lapeer, Mich.

[73] Assignee: The Colonel's, Inc., Milan, Mich.

[21] Appl. No.: 09/174,728

[22] Filed: Oct. 19, 1998

[51] Int. Cl.[7] .............................. B28B 11/08; B28B 17/00
[52] U.S. Cl. ..................... 425/215; 264/162; 264/544; 264/553; 264/554; 425/297; 425/326.1; 425/327; 425/385
[58] Field of Search ...................................... 264/151, 162, 264/544, 553, 554; 425/325, 327, 385, 363, 296, 304, 215, 297, 326.1

[56] References Cited

U.S. PATENT DOCUMENTS

| | | | |
|---|---|---|---|
| 1,438,231 | 12/1922 | Goodenberger | 425/325 |
| 2,191,106 | 2/1940 | Denison et al. | 425/325 |
| 2,849,752 | 9/1958 | Leary | 425/327 |
| 2,951,305 | 9/1960 | Seymour | 425/325 |
| 3,399,425 | 9/1968 | Lemelson | 425/325 |

*Primary Examiner*—Jan H. Silbaugh
*Assistant Examiner*—Dae Young Lee
*Attorney, Agent, or Firm*—Gifford, Krass, Groh, Sprinkle, Anderson & Citkowski, P.C.

[57] ABSTRACT

A method and apparatus for forming a skid-resistant surface on a thermoformed object such as a bed liner. The method includes forming a blank of extruded plastic material, abrading the surface with a wire brush, reheating the blank and thermoforming the blank to open the abraded surface of the blank. The apparatus includes an extruder delivery mechanism delivering a blank of sheet material to a wire brush which is turned by an electric motor at a speed slightly greater and in the same direction as the travel of the blank under the roller.

5 Claims, 1 Drawing Sheet

METHOD OF MAKING A SKID-RESISTANT BED LINER

FIELD OF THE INVENTION

A method and apparatus for forming a skid-resistant surface on a thermoformed object and more particularly a method and apparatus having a device for abrading the surface of a blank before thermoforming.

BACKGROUND OF THE INVENTION

It is frequently desirable to form a non-slip or skid-resistant surface on the surface of thermoformed objects such as truck bed liners. Typically, truck bed liners are thermoformed from blanks of extruded plastic material. The plastic is extruded into a continuous sheet which is wider than necessary for the mold of a thermoforming machine. Typically a pattern is formed on one side of the sheet by embossing the top surface of the sheet with a roller having a pattern as the sheet exits the extruder. The pattern is typically formed to have a texture and appearance of leather. Although the roller forms indentations in the surface of the sheet, the surface is sufficiently smooth that cargo and the like can slide on the surface of the truck bed liner when a vehicle turns, stops or accelerates.

Accordingly, various methods have been employed by the manufacturers of liners to prevent movement of cargo. It is known as disclosed in U.S. Pat. No. 5,265,993 to Wayne to mount cross members or dividers above the floor of the liner to form a grid to hold cargo from movement.

It is also known as disclosed in U.S. Pat. No. 5,549,428 to Yeatts to form devices which have ribs which lock in the longitudinal grooves of the floor. The top surface of the device is formed of material which produces greater friction than the surface of the liner and thereby reduces movement of the cargo.

Finally, it is known to cover the top surface of the liner with a skid-resistant coating, such as disclosed in U.S. Pat. No. 4,693,507. However, the coating prevents the recycling of scrap liner material, thereby adding greatly to the cost of the liner.

Accordingly it is an object of the invention to produce a slip or skid-resistant surface for a liner which is economically produced.

SUMMARY OF THE INVENTION

A method and apparatus for producing a skid-resistant surface on items produced by thermoforming includes extruding a thermoformed sheet of material, abrading a top surface of the sheet to form a plurality of indentations, forming a blank of said thermoplastic material from said sheet, and thermoforming said blank to form a molded object and to open said indentations to form a skid resistant surface on said object. The abrading step may be accomplished by passing the sheet under a wire brush rotating in the same direction as the direction of travel of the sheet and at a slightly greater speed.

The apparatus includes a conventional thermoplastic extruding machine and a delivery mechanism to deliver the sheet from the extruder to an abrading station. The abrading station includes rollers for delivering the sheet to pass beneath a rotatable wire brush. The wire brush is mounted to extend transversely to the direction of travel of the sheet and is rotated in the same direction at a slightly greater speed by a motor. The apparatus also includes a conventional cutter to trim the sheet into rectangular blanks and a conventional thermoforming machine. A hood extends over the roller to collect material ground from the surface by the brush. Additionally, a receptacle may be mounted beneath the brush to collect the ground off material.

Other objects and many of the attendant advantages of this invention will be readily appreciated as the same becomes better understood by reference to the following detailed description when considered in connection with the accompanying drawings which illustrate a preferred embodiment and wherein:

DETAILED DESCRIPTION OF THE PREFERRED EMBODIMENT

Figure 1:
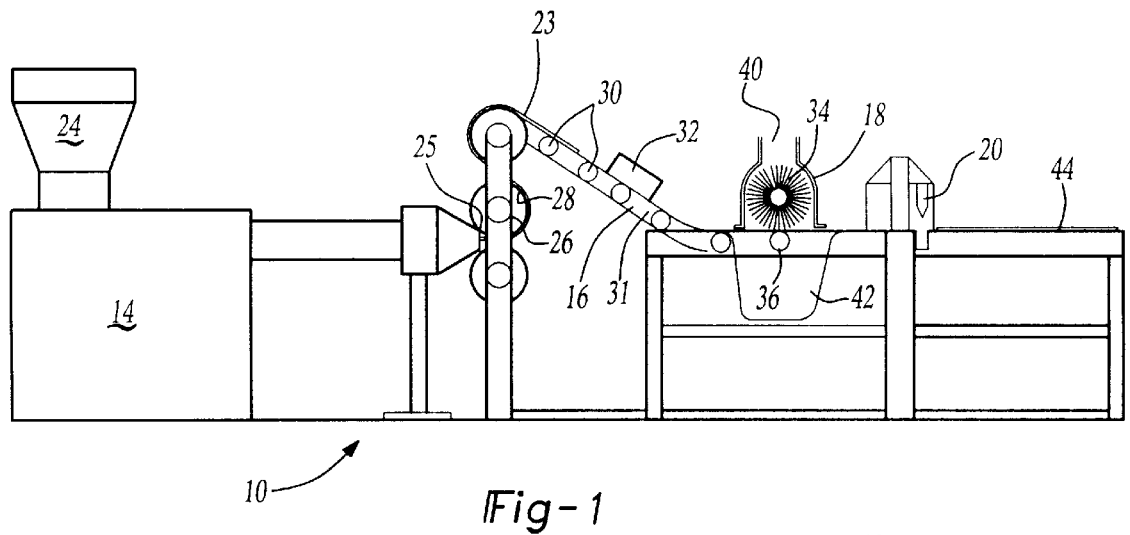
FIG. 1 is a perspective view of a portion of an apparatus including an abrasion station in accordance with the invention.
Figure 2:
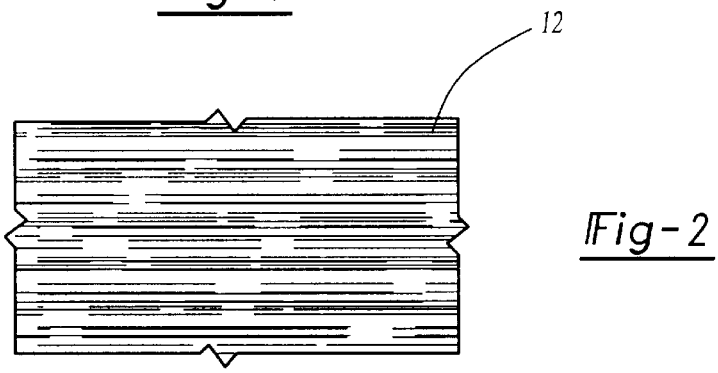
FIG. 2 is a top view of a sheet of material after it has been formed according to the method of the invention.
Figure 3:
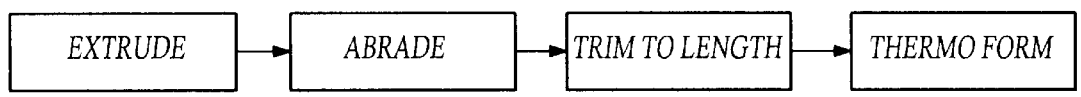
FIG. 3 is a flow chart showing the steps of the method in accordance with the invention.
Figure 4:
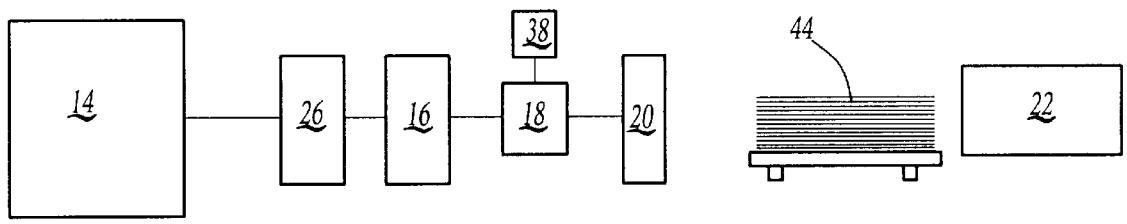
FIG. 4 is a schematic chart showing the apparatus in accordance with the invention.

As shown in FIGS. 1 and 4 is an apparatus 10 for forming a skid-resistant surface 12 (FIG. 2) on a thermoformed object such as a truck bed liner. The apparatus 10 includes an extruder 14, a delivery mechanism 16, an abrading station 18, a shear 20 and thermoforming machine 22 (FIG. 4).

The extruder 14 is of any conventional type which produces a continuous flat sheet of thermoformable plastic material. The extruder 14 includes a hopper 24 for feeding raw or ground up scrap thermoplastic into a drum (not shown) where the material is heated until it melts. The material is then extruded through an aperture 25 into a sheet 23 which is fed to an embossing roller 26. The embossing roller 26 forms a pattern on the top surface 28 of the sheet while the sheet is still hot or at approximately 150° or more. In the case of truck bed liners, the pattern is typically formed to produce a surface which has a leather-like grain with a generally smooth top surface but with an irregular grid of lines extending a slight distance into the surface to form the grain.

The delivery mechanism such as a conveyor or a series of rollers 30 disposed in a downwardly angled path extends from the embossing rollers downwardly to the abrading station 18. The brush forms a continuous pattern of small indentations in the top surface of the sheet 23 The rollers 30 are supported by a frame 31. The sheet 23 cools as it travels across the rollers. A pair of edge slitters 32 may be positioned at opposite sides of the frame 31. The slitters 32 are movable to trim the sheet to a desired width as it passes through.

As shown in FIG. 1, the abrading station includes a wire brush 34 which is disposed transversely to the direction of travel of the sheet. Rollers 36 are disposed beneath the brush to support the sheet 23 as it passes at a predetermined rate of speed, such as 4 to 5 feet per minute, beneath the brush 34. The brush is a conventional cylindrical wire brush such as produced by Weiler Co. of Cresco, Pa. The brush 34 has an outer diameter of approximately 10 inches and an inner diameter of two inches. The wires of the brush extend fully across the width of the sheet. The wires are medium crimped and have a diameter of 0.014 inches. The brush is rotated by a motor 38 so as to have the outer surface of the brush 34 rotate in the same direction as the direction of travel of the sheet 23 (i.e. the brush rotates counterclockwise along a sheet moving from left to right as shown in FIG. 1). The motor 38 turns the brush 34 at a speed such as 600 rpm which is slightly greater than the rate of travel of the sheet. A hood 40 extends over the wire brush 34 to prevent particles removed from the sheet by the brush from being cast into the air. A receptacle 42 is included for collecting the removed particles. The brush forms a continuous pattern of small indentations in the top surface of the sheet 23.

As shown in FIG. 1 a conventional shear 20 is located downstream from the abrading station 18. The shear 20 is used to trim the sheet 23 in blanks 44 having desired length for thermoforming the finished object. The blanks are then placed in the thermoforming machine 22 where they are reheated and drawn into a mold. The reheating and molding opens the indentations produced by the brush to form a rougher surface on the product which is skid resistant. The method according to the invention includes extruding a sheet of thermoplastic. In the preferred embodiment, the sheet is embossed with a textured leather-like surface as it is extruded at a temperature of approximately 150°.

The sheet is then cooled to approximately 130° as it is delivered by the rollers 30 to the abrading station 18. In the preferred embodiment the pair of edge rippers 32 are used to size the width of the sheet as it passes on an incline downwardly to the abrading station.

At the abrading station 18 the sheet passes over a roller 36 and beneath a rotating wire brush 34. The brush rotates in the same direction as the direction of travel as the sheet and at a slightly higher speed. The sheet travels at approximately 4–5 feet/minute and the brush rotates at about 600 rpm. The brush forms a dispersion of pin pricks or indentations about the size of the diameter of the wires of the brush in the top surface of the sheet 23.

The sheet 23 is then sheared to length to form blanks 44 for thermoforming. The blanks may be used immediately or stored on pallets at room temperature until used in the molding process. When the blank 44 is thermoformed, it is reheated until soft at about a temperature of 350° and then vacuum formed on a mold. After molding and cooling, the indentations formed by the wire brushes open slightly providing a surface which is rough and produces greater friction than conventionally molded surfaces. The surfaces then act to provide a skid-resistant surface.

Obviously, many other modifications and variations of the present invention are possible in light of the above teachings. It is therefore to be understood that within the scope of the appended claims, the invention may be practiced otherwise than is specifically described by those of ordinary skill in the art without departing from the spirit and scope of the invention, as hereinafter defined by the appended claims.

What I claim is:

1. An apparatus for thermoforming an object with a skid-resistant surface said apparatus comprising;

an extruder for forming a continuous sheet of thermoplastic material, said sheet having a top surface and a bottom surface;

a conveyor for delivering said sheet of material from said extruder to an abrading station, said abrading station having a cylindrical wire brush mounted to extend transversely to said sheet of material, said wire brush forming a plurality of apertures in said top surface of said sheet;

a motor for rotating said wire brush against the top surface of said sheet;

a shear located downstream of said abrading station to trim said sheet into a plurality of blanks; and a thermoforming machine for receiving said blanks, said thermoforming machine including a mold and means for heating and drawing said blanks into the mold to form molded objects and increase the diameter of said plurality of apertures in said blanks thereby altering the roughness of said blanks.

2. The apparatus of claim 1 wherein said abrading station further comprises said motor turning said brush in a direction the same as a direction of travel of said sheet.

3. The apparatus of claim 1 wherein said motor rotates said wire brush at a speed slightly greater than a rate of travel of said sheet.

4. The apparatus of claim 1 wherein said extruder further includes an embossing roller contacting said top surface of said sheet.

5. The apparatus of claim 1 wherein said abrading station further includes a hood extending over said wire brush.

* * * * *

UNITED STATES PATENT AND TRADEMARK OFFICE
CERTIFICATE OF CORRECTION

PATENT NO. : 6,095,787
DATED : Aug. 1, 2000
INVENTOR(S) : Dennis B. Bills, Sr.

It is certified that error appears in the above-identified patent and that said Letters Patent are hereby corrected as shown below:

Column 3, line 18-19 - "The method according to the invention includes extruding a sheet of thermoplastic." Starts a new paragraph.

Column 4, line 12 - After "surface" insert --,--

Signed and Sealed this

Tenth Day of April, 2001

Attest:

NICHOLAS P. GODICI

Attesting Officer       Acting Director of the United States Patent and Trademark Office